US011904780B2

(12) United States Patent
Kroll et al.

(10) Patent No.: US 11,904,780 B2
(45) Date of Patent: Feb. 20, 2024

(54) SUPPORT ASSEMBLY FOR A TOOL ON A UTILITY VEHICLE

(71) Applicant: Polaris Industries Inc., Medina, MN (US)

(72) Inventors: Andrew H. Kroll, Minneapolis, MN (US); Christopher J. Juelich, St. Louis Park, MN (US); Paul L Mattson, Harris, MN (US)

(73) Assignee: Polaris Industries Inc., Medina, MN (US)

( * ) Notice: Subject to any disclaimer, the term of this patent is extended or adjusted under 35 U.S.C. 154(b) by 121 days.

(21) Appl. No.: 17/154,229

(22) Filed: Jan. 21, 2021

(65) Prior Publication Data

US 2022/0227310 A1    Jul. 21, 2022

(51) Int. Cl.
| | |
|---|---|
| *B60R 11/06* | (2006.01) |
| *B60R 9/06* | (2006.01) |
| *B25H 5/00* | (2006.01) |
| *B60R 11/00* | (2006.01) |

(52) U.S. Cl.
CPC ............... *B60R 11/06* (2013.01); *B25H 5/00* (2013.01); *B60R 9/06* (2013.01); *B60R 2011/004* (2013.01)

(58) Field of Classification Search
CPC .............. B60R 11/06; B60R 2011/004; B60R 2011/0071; B60R 9/06
USPC ....................................... 292/256.71, 256.75
See application file for complete search history.

(56) References Cited

U.S. PATENT DOCUMENTS

| | | | | |
|---|---|---|---|---|
| 1,584,301 | A * | 5/1926 | Joyce ..................... | B60R 11/06 206/349 |
| 1,944,289 | A * | 1/1934 | Leonhauser .............. | B60L 5/12 191/1 R |
| 2,988,317 | A * | 6/1961 | Butzow ................... | B60R 11/06 16/304 |
| 2,999,378 | A * | 9/1961 | Blair ..................... | A63C 11/006 280/814 |
| 3,893,568 | A * | 7/1975 | Lile ...................... | A47B 81/005 211/49.1 |
| 4,009,853 | A * | 3/1977 | Lile ....................... | B25H 3/006 224/403 |
| 4,245,745 | A * | 1/1981 | Verelle .................. | A63C 11/007 211/8 |
| 4,312,467 | A * | 1/1982 | Kulwin ..................... | B60R 9/12 224/323 |
| 4,785,980 | A * | 11/1988 | Redick ..................... | B60R 9/12 224/511 |

(Continued)

FOREIGN PATENT DOCUMENTS

| | | | |
|---|---|---|---|
| WO | WO-9804867 A1 * | 2/1998 | ............. F21V 21/08 |
| WO | 2014/059258 | 4/2014 | |

OTHER PUBLICATIONS

Kolpin Chainsaw holder, available at https://www.kolpin.comnien-us/shopiaccessories/gun-transport-carriers/saw-transport/chain-saw-press/; 5 pages, available at least as early as Oct. 20, 2020.

*Primary Examiner* — Dennis H Pedder
(74) *Attorney, Agent, or Firm* — Faegre Drinker Biddle & Reath LLP

(57) ABSTRACT

A support assembly configured for holding at least one tool includes a first mounting plate, a door pivotable relative to the mounting plate. The door includes a retention feature. The support assembly further includes a clamping assembly configured for clamping the door to the mounting plate.

20 Claims, 11 Drawing Sheets

(56) References Cited

U.S. PATENT DOCUMENTS

| | | | | |
|---|---|---|---|---|
| 4,867,362 | A * | 9/1989 | Finnegan | B60R 9/12 |
| | | | | 280/727 |
| 5,076,531 | A * | 12/1991 | Delaney | E05B 67/383 |
| | | | | 292/281 |
| 5,085,326 | A * | 2/1992 | Russell | B60P 7/12 |
| | | | | 211/60.1 |
| 6,457,618 | B1 * | 10/2002 | Hancock | B60R 7/14 |
| | | | | 224/558 |
| 8,104,524 | B2 | 1/2012 | Manesh | |
| 8,176,957 | B2 | 5/2012 | Manesh | |
| 9,566,858 | B2 | 2/2017 | Hicke | |
| 10,967,694 | B2 | 4/2021 | Brady | |
| 11,198,401 | B2 * | 12/2021 | Tressel | A01D 75/006 |
| 2004/0262462 | A1 * | 12/2004 | Polak | H02G 3/30 |
| | | | | 248/74.1 |
| 2017/0267187 | A1 * | 9/2017 | Rarey | B60R 9/08 |
| 2019/0344727 | A1 | 11/2019 | Winkler | |

\* cited by examiner

SUPPORT ASSEMBLY FOR A TOOL ON A UTILITY VEHICLE

FIELD OF THE DISCLOSURE

The present invention relates generally to a support assembly for supporting at least one tool or accessory on a vehicle.

BACKGROUND OF THE DISCLOSURE

During the use of various vehicles such as utility vehicles, all-terrain vehicles, tractors, and others, it may be beneficial to transport tools or accessories with the passengers without using the space located within the operator or cargo areas. This is applicable for many agricultural or industrial uses. The relevant tools may include a chainsaw, an axe, a shovel, or a pick. While some assemblies exist in this field, they may be limited to the retention of one tool, for example a chainsaw. Thus, there remains a need for an assembly that has the capability of supporting a variety of tools on the vehicle while still maximizing the space used within an operator area.

SUMMARY OF THE DISCLOSURE

In one embodiment of the present disclosure, a support assembly configured for holding at least one tool includes a first mounting plate, a door pivotable relative to the mounting plate and the door having a retention feature, and a clamping assembly configured for clamping the door to the mounting plate.

In another embodiment of the present disclosure, a support assembly configured for placement onto a utility vehicle includes a mounting plate, a door attached to the mounting plate and pivotable relative to the mounting plate. The door includes a retention feature configured for supporting at least one tool and pivotable relative to the door. The support assembly further includes a first clamping assembly configured for clamping the door to the mounting plate and a second clamping assembly configured for clamping the groove to the door.

In a further embodiment of the present disclosure, a support assembly configured for placement onto a vehicle includes a mounting plate and a door attached to, and pivotable relative to, the mounting plate. The support assembly further includes a first clamping assembly configured for reversible clamping the mounting plate to the door. The support assembly further includes a retention feature attached to the door configured for supporting at least one tool.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle, whether configured for off-road or on-road use. For example, the present disclosure is applicable to an off-road vehicle with one or more ground-engaging members and a continuously variable transmission, including, but not limited to, all-terrain vehicles, agricultural vehicles, industrial vehicles, tractors, motorcycles, snowmobiles, scooters, three-wheeled vehicles, and golf carts, and is equally applicable to tractors, agricultural vehicles and equipment, industrial vehicles and equipment, and on-road vehicles, such as cars, trucks, sport utility vehicles, etc.

Figure 1:
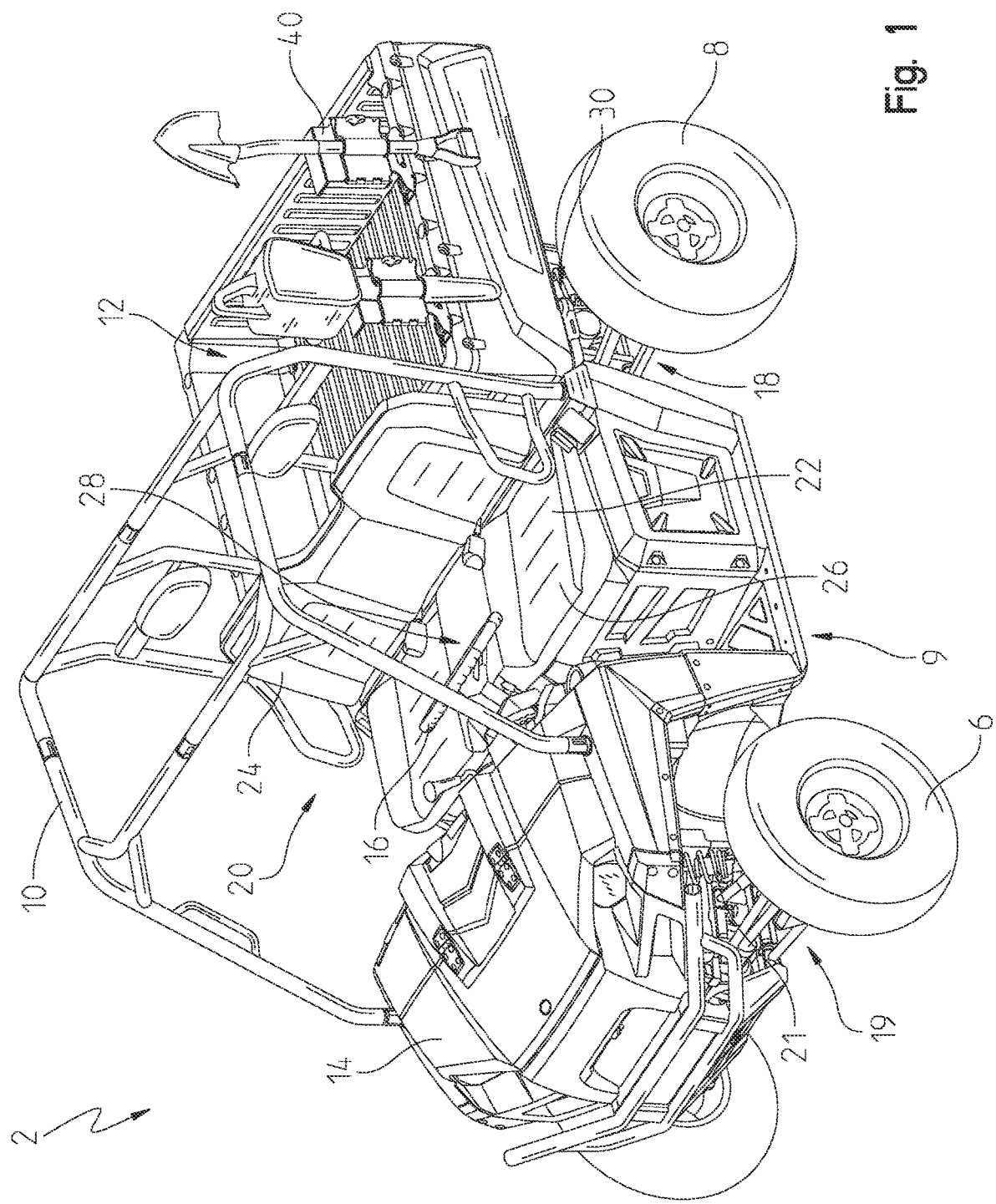
FIG. 1 is a front left perspective view of a utility vehicle including a support assembly of the present disclosure.

Referring to FIG. 1, an illustrative embodiment of a utility vehicle 2 is shown. Vehicle 2 is configured for off-road operation, however, the present disclosure is not limited to such a vehicle. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Vehicle 2 further includes a frame assembly defined by a lower frame assembly 9 supported by ground-engaging members 4. Additionally, in one embodiment, vehicle 2 may include an upper frame assembly 10 extending vertically above lower frame assembly 9, however, alternative embodiments of vehicle 2 may not include upper frame assembly 10. The lower frame assembly supports a rear cargo area 12 and a vehicle body 14, which includes a plurality of body panels, such as a hood, front fender, rear fender, etc.

Vehicle 2 also includes an operator area 20 which, illustratively, includes seating 22 for one or more passengers. In some embodiments, operator area 20 is exposed to ambient air and is not fully enclosed while in other embodiments, operator area 20 may be at least partially enclosed by a roof, doors, windshields, and/or any other component(s). Upper frame assembly 10 may be positioned generally around operator area 20 such that seating 22 is at least partially surrounded by upper frame assembly 10. Illustratively, seating 22 includes an operator seat and a passenger seat, however, seating 22 may also include rear seats for additional passengers or may include only a single seat for carrying the operator. Seating 22 may include a seat back 24 and a seat bottom 26. Vehicle 2 further includes at least one support assembly 40 configured for supporting one or more tools or accessories on vehicle 2 which will be described in detail herein.

Operator area 20 further includes a plurality of operator controls 28, such as a steering wheel 16, by which an operator may provide inputs for operating vehicle 2. Various operator controls, including the steering assembly, may be further described in International Patent Application No. PCT/US13/64516, filed on Oct. 11, 2013, the complete disclosure of which is expressly incorporated by reference herein.

Referring still to FIG. 1, vehicle 2 includes a rear suspension assembly 18 and a front suspension assembly 19, both supported by lower frame assembly 9. Suspension assemblies 18, 19 include shock absorbers, for example shock absorbers 21 of front assembly 19. Additional details of rear and front suspension assemblies 18, 19 may be disclosed in U.S. Pat. No. 9,566,858, issued on Feb. 14, 2017 and U.S. patent application Ser. No. 16/226,797, filed Dec. 20, 2018, the complete disclosures of which are expressly incorporated by reference herein.

Referring still to FIG. 1, vehicle 2 further includes a powertrain assembly 30 which is supported by lower frame assembly 9 and includes at least a prime mover, illustratively an engine (not shown), a gear train which may be configured as or include a shiftable transmission (not shown), and a continuously variable transmission ("CVT") (not shown). Powertrain assembly 30 further includes final drives or differentials, for example a front drive and/or a rear drive.

The engine may be positioned rearward of operator area 20. While the prime mover is disclosed as engine, the prime mover may be any type of device configured to provide power to vehicle 2, such as an electric motor, a fuel-based engine, a hybrid engine, a generator, etc. The engine may be any size and include any number of cylinders, for example one cylinder, two cylinders, three cylinders, four cylinders, six cylinders, or eight cylinders.

Figure 2:
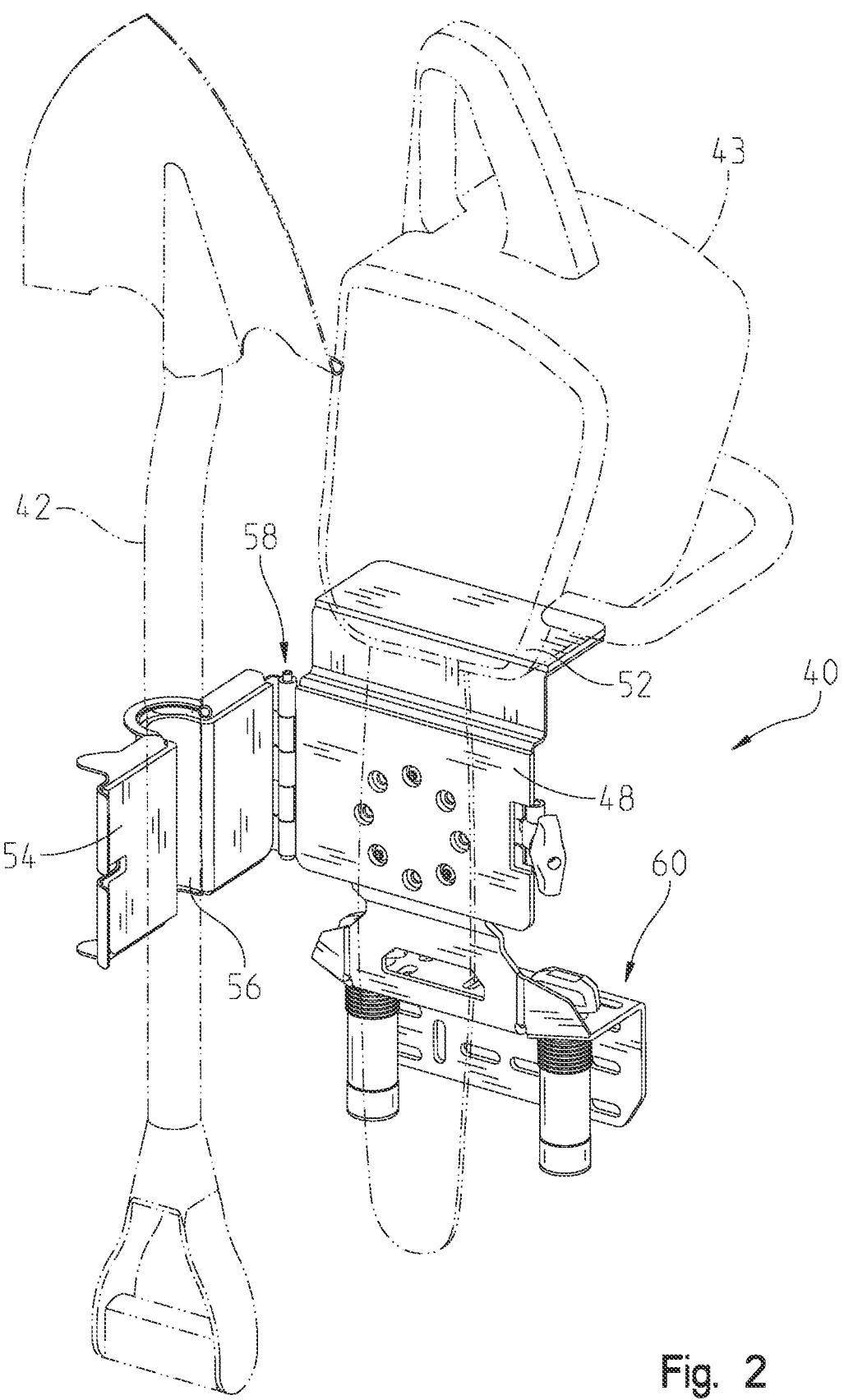
FIG. 2 is a perspective view of the support assembly of FIG. 1 in an open position.

FIG. 2 is an illustrative embodiment of the support assembly 40. Support assembly 40 is configured for mounting to or otherwise being supported by vehicle 2 (FIG. 1) and holding at least one tool or accessory 42 such that tool 42 can be secured to the vehicle 2 (FIG. 1). Illustratively, as shown in FIG. 1, support assembly 40 may be removably coupled or otherwise supported at a rear of vehicle 2, for example, at a position adjacent cargo area 12 along an outer side of a rear fender of vehicle 2. In other embodiments, support assembly 40 may be positioned at any location of vehicle 2.

In some embodiments, support assembly 40 is configured for holding a first tool 42 and a second tool or accessory 43 simultaneously. In other embodiments, support assembly 40 holds one of the first and second tools 42, 43 independently. While the illustrative embodiments described in the present disclosure illustrate the first tool 42 as a shovel and a second tool 43 as a chainsaw, alternative tools and/or accessories may be configured for use with support assembly 40, for example including, but not limited to, an axe, a hammer, a pick and/or other suitable tools comprising a handle or an accessory of vehicle 2.

Referring still to FIG. 2, support assembly 40 includes a mounting plate 48 attached to a door 54, a support plate 52 which can provide additional support for holding tool 43, and an attachment assembly 60 configured for mounting support assembly 40 to vehicle 2 (FIG. 1). In various embodiments, for example when tool 43 defines a chainsaw, support plate 52 is configured to provide additional support for the motor thereof. In some embodiments, attachment assembly 60 may be the Lock & Ride® system available from Polaris, Inc., located at 2100 Hwy. 55, Medina, MN 55340 such as that shown in U.S. Patent Application Publication No. 63/056,201, filed Jul. 24, 2020, and entitled "ARTICLE MOUNTING SYSTEM FOR A VEHICLE," the complete disclosure of which is expressly incorporated herein by reference.

Door 54 cooperates with mounting plate 48 to define a first support portion configured to support at least second tool 43, as disclosed further herein. Additionally, door 54 of support assembly 40 further comprises a second support portion, illustratively shown as a retention feature defined as a groove 56, configured for holding tool 42. In embodiments, groove 56 is continuous and integrally formed with door 54 such that an outer surface of door 54 extends continuously and integrally from a first end to a second end and includes groove 56 along such distance or length. Door 54 is attached to mounting plate 48 with a hinge assembly 58 so that door 54 is pivotable with respect to mounting plate 48. The embodiment of FIG. 2 shows the door 54 in an open configuration, door 54 being rotated outwardly with respect to mounting plate 48. This open configuration allows for tool 42, 43 to be inserted into groove 56 or against mounting plate 48 before closing door 54. Similarly, the open configuration is desired for removing or repositioning of tool 42, 43.

Figure 3:
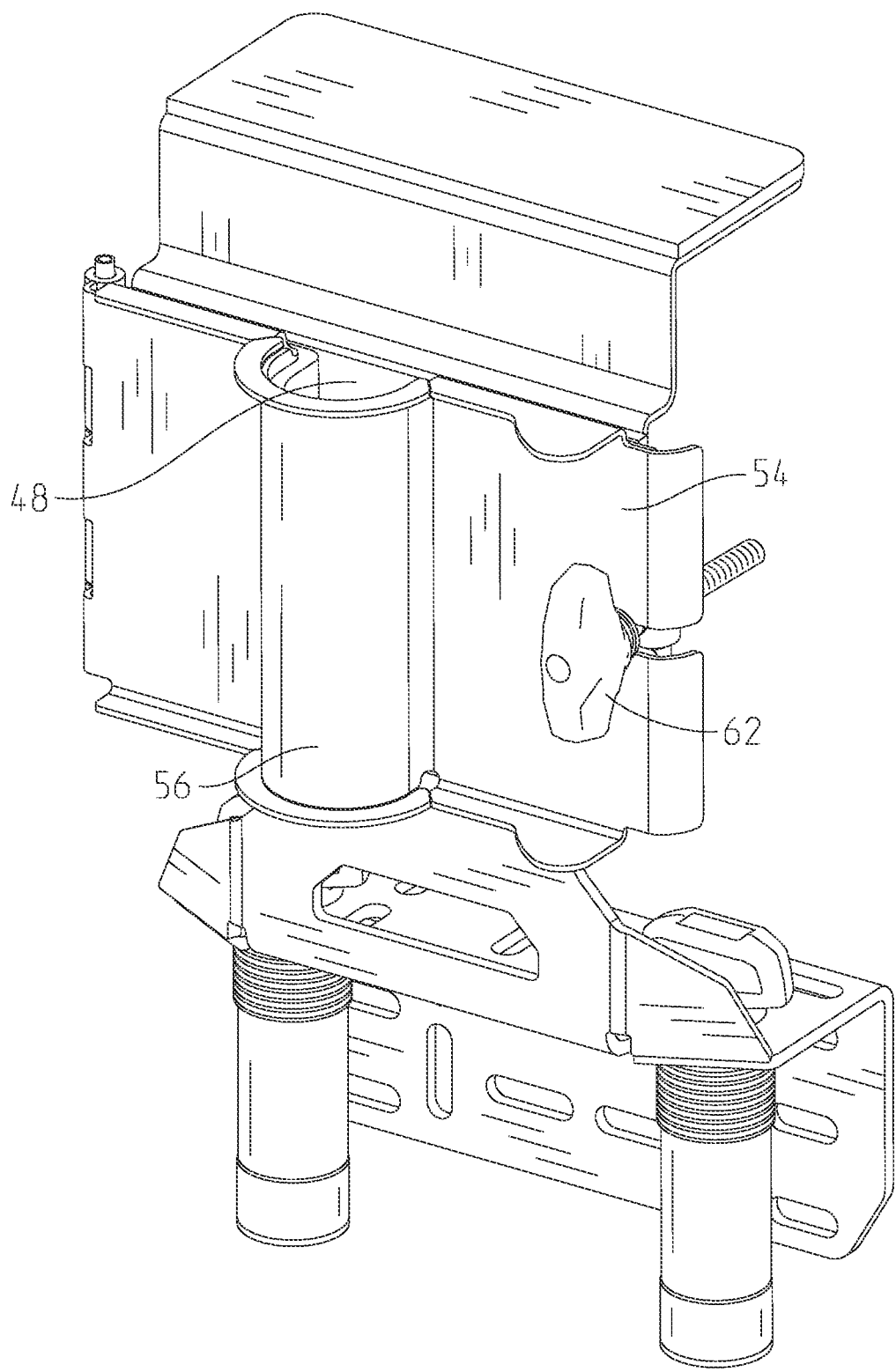
FIG. 3 is a perspective view of the support assembly of FIG. 2 in a closed position.

Referring now to FIG. 3, support assembly 40 of FIG. 2 is disclosed with door 54 in a closed configuration, which retains tool 42, 43 in a desired position either within groove 56 or against mounting plate 48. Support assembly 40 further comprises a clamping assembly 62 which allows door 54 to be secured in the closed configuration. In this way, during vehicle operation, tool(s) 42 and/or 43 is/are secured within support assembly 40 and door 54 will not open when it is not desired. In some embodiments, clamping assembly 62 may further comprise a locking mechanism. In these embodiments, support assembly 40 can be locked and tools 42, 43 can only be accessed by those with the ability to unlock the locking mechanism. Clamping assembly 62 may be released to open door 54. Clamping assembly 62 can be a combination of a clamping knob and bolt, or any other known mechanism for clamping, locking, securing, or maintain door 54 in the closed configuration.

In this way, when door 54 is in the open configuration, one or more of tools 42, 43 may be positioned against mounting plate 48 and a portion of door 54 and retained within support assembly 40 when clamping assembly 62 secures door 54 to mounting plate 48. More particularly, when it is desired to transport or support a tool or accessory having a flat portion (e.g., a chainsaw) on vehicle 2, the flat portion may be positioned against mounting plate 48 and door 54 is moved to the closed configuration and secured to mounting plate 48 with clamping assembly 62. Alternatively, if it desired to transport or support a tool or accessory having a rounded portion, such as a handle, the rounded portion may be positioned within groove 56 and in contact with groove 56 and mounting plate 48 when door 54 is secured to mounting plate 48. In other embodiments, both a tool/accessory with a flat portion and a tool/accessory with a rounded portion may be simultaneously supported by support assembly 40 by positioning the flat portion of one tool/accessory against mounting plate 48 and positioning the rounded portion of the other tool/accessory against groove 56 and moving door 54 to the closed configuration. In such instances, a portion of the tools/accessories may contact each other while both being retained by support assembly 40.

Figure 4:
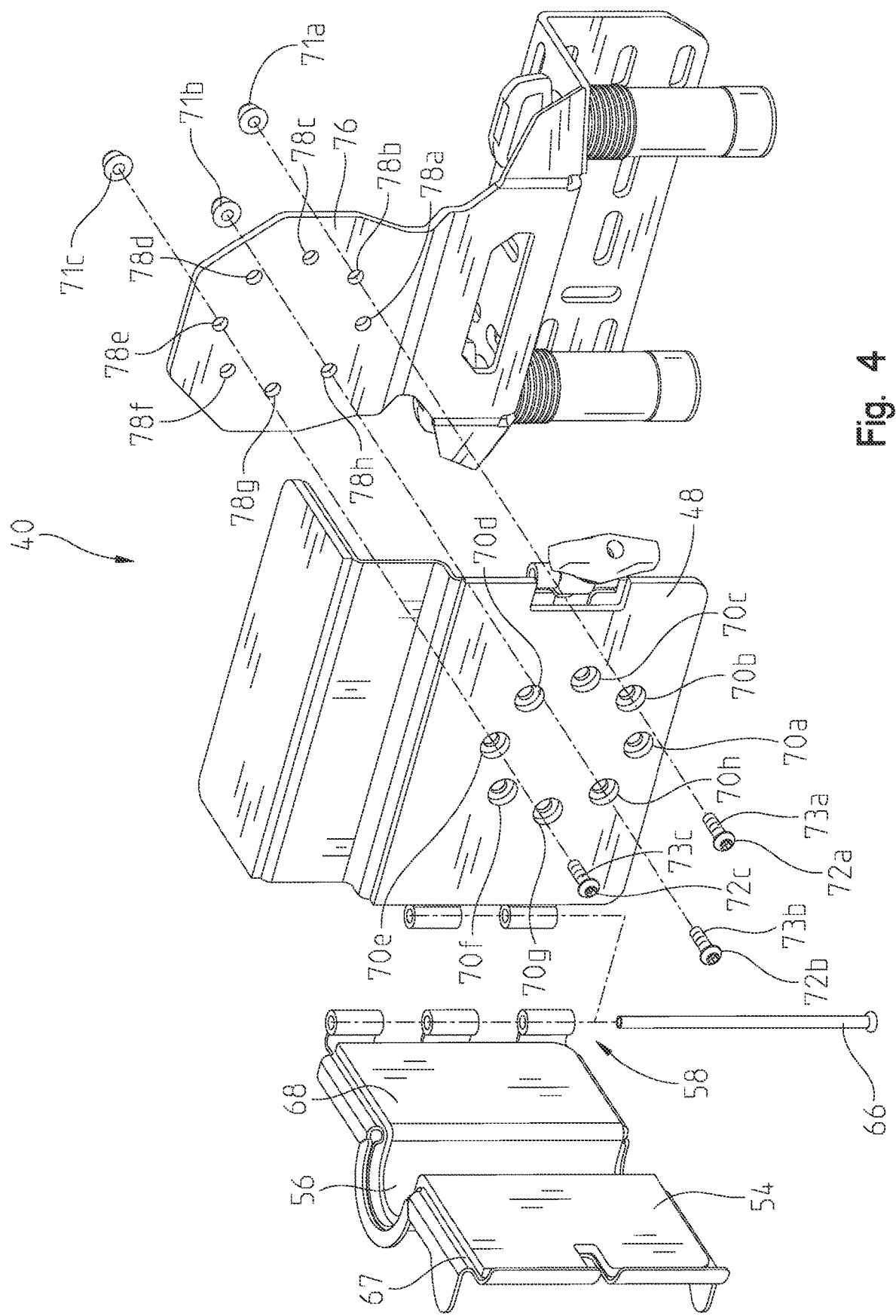
FIG. 4 is an exploded view of the support assembly of FIG. 3.

Referring now to FIG. 4, an exploded view of support assembly 40 is illustrated. Hinge assembly 58 comprises a hinge pin 66 for rotatably connecting mounting plate 48 to door 54 such that door 54 remains pivotable relative to mounting plate 48 for moving between the open and closed configurations. Door 54 further comprises a retention element 68 for securing tool 42, 43. In embodiments, retention element 68 is positioned on the entirety of an inner surface 67 of door 54 and groove 56. In other embodiments, retention element 68 may be positioned on a portion of groove 56 and/or a portion of door 54. Retention element 68 may additionally cover at least a portion of an inner surface 49 of mounting plate 48. In certain instances, retention element 68 covers the entirety of inner surface 49 of mounting plate 48. In these embodiments, tool 42, 43 may be positioned within groove 56 or between door 54 and mounting plate 48 and the material of retention element 68 may provide retention through the ability to grip onto tool 42, 43, such as through the friction between retention element 68 and tool 42, 43 when door 54 is in the closed configuration. In embodiments, retention element 68 is a layer of material that can include, but is not limited to, foam, rubber, or gripping tape.

Referring still to FIG. 4, mounting plate 48 comprises a plurality of openings 70a-h configured for receiving a plurality of fasteners 72a, 72b, 72c for attachment of mounting plate 48 to a backing plate 76 of support assembly 40. Backing plate 76 comprises a plurality of openings 78a-h corresponding to the plurality of the openings 70a-h of mounting plate 48. In embodiments, fasteners 72a-c are composed of nuts 71a-c and bolts 73a-c. The number of the plurality of openings 70a-h may be greater than the number of plurality of fasteners 72a-c such that mounting plate 48 is attached to backing plate 76 without requiring each opening of the plurality of openings 78a-h, 70a-h to be occupied by a fastener 72a-c. This allows for different possible angles of rotation or mounting positions of mounting plate 48 with respect to backing plate 76 when attached, as disclosed further herein.

Figure 5A:
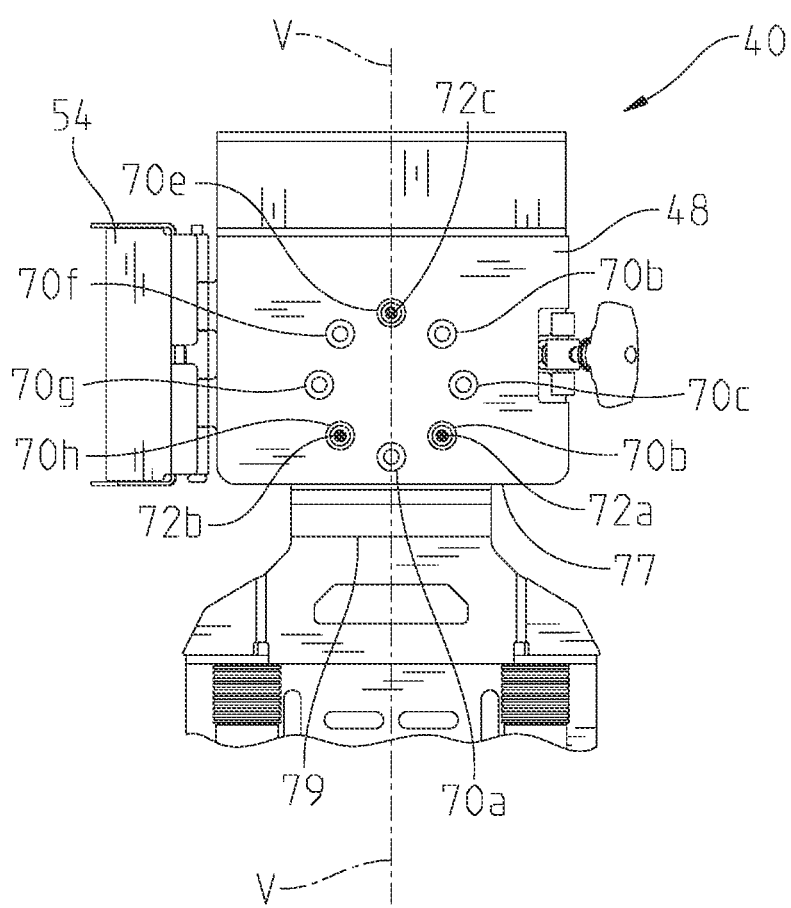
FIG. 5A is a side elevational view of the support assembly of FIG. 3 in a first mounting position.
Figure 5B:
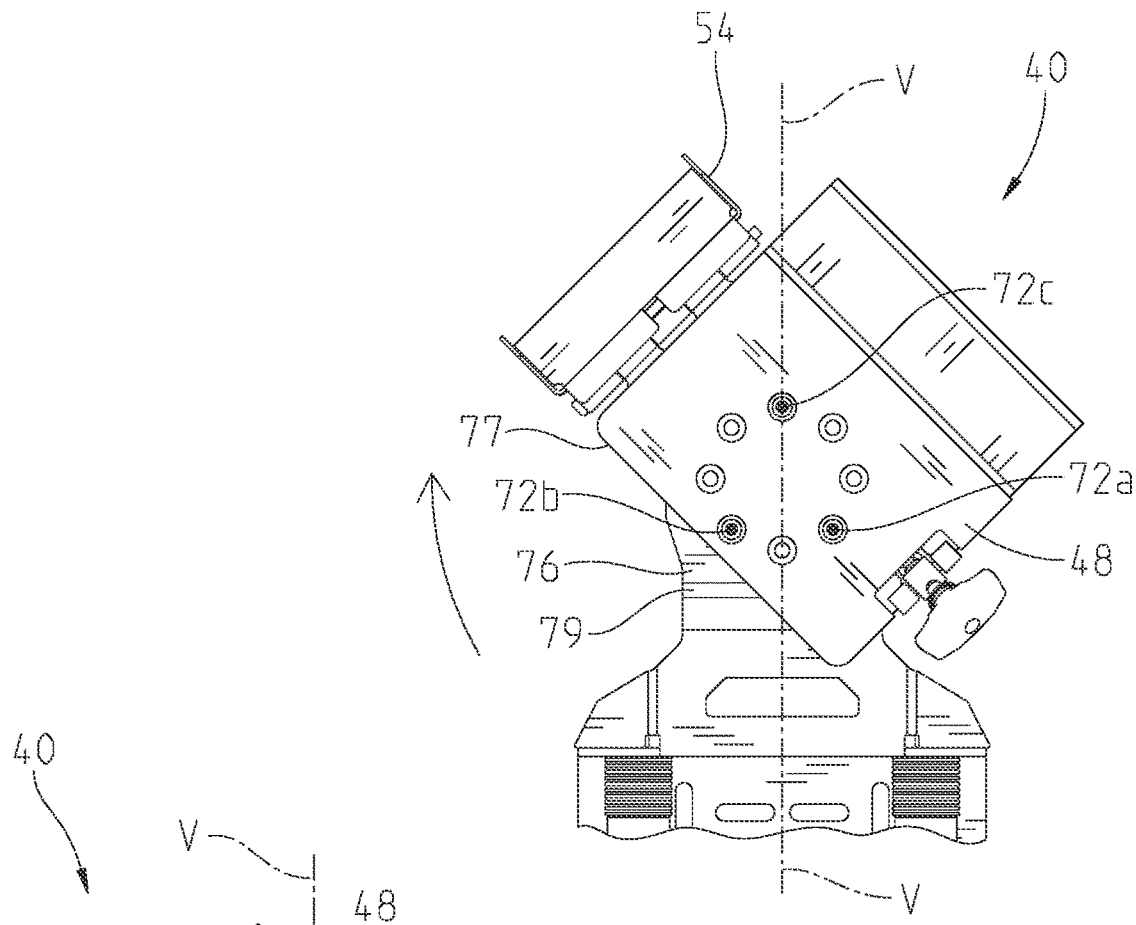
FIG. 5B is a side elevational view of the support assembly of FIG. 3 in a second mounting position.
Figure 5C:
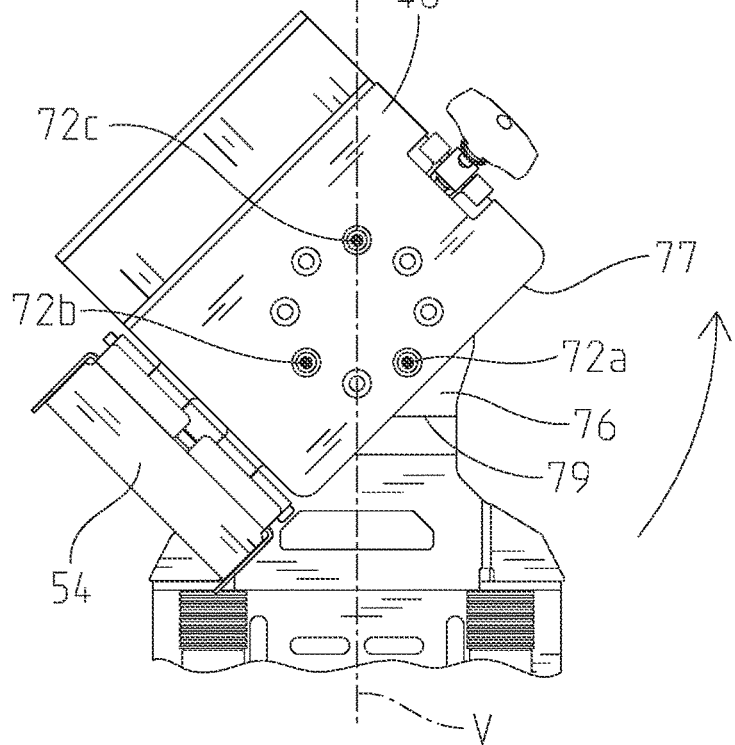
FIG. 5C is a side elevational view of the support assembly of FIG. 3 in a third mounting position.

FIGS. 5A-5C each illustrate a side view of support assembly 40 with illustrative orientations of mounting plate 48 attached to backing plate 76. In each embodiment, door 56 is attached to and rotated outwardly with respect to mounting plate 48. With reference to FIG. 5A, a bottom edge 77 of mounting plate 48 is generally parallel with a bottom edge 79 of backing plate 76 and both bottom edges 77, 79 are approximately perpendicular to a vertical axis V.

Referring now to FIG. 5B, fasteners 72a-c are positioned within three of the plurality of openings 70a-h such that bottom edge 77 of mounting plate 48 is rotated clockwise to an angle of generally 45 degrees with respect bottom edge 79 of backing plate 76 and vertical axis V.

Referring now to the embodiment of FIG. 5C, mounting plate 48 is rotated counterclockwise such that bottom edge 77 of mounting plate 48 is at an angle of generally 45 degrees relative to bottom edge 79 of backing plate 76 and vertical axis V. In other embodiments, mounting plate 48 may be rotated in either the clockwise or counterclockwise direction such that bottom edge 77 is at an angle ranging between 0 to 90 degrees relative to bottom edge 79 of backing plate 76. For example, in certain instances, bottom edge 77 of mounting plate 48 is rotated clockwise or counter clockwise to an angle of generally 45-75 degrees with respect to bottom edge 79 of backing plate 76 and vertical axis V. In other instances, bottom edge 77 of mounting plate 48 is rotated to an angle of generally 90 degrees with respect to bottom edge 79 of backing plate 76 and vertical axis V. The number of the plurality of fasteners 72a-c may be varied in different embodiments. Similarly, the number of openings for each the plurality of openings 70a-h of mounting plate 48 and the plurality of openings (not shown) of backing plate 76 are variable.

Figure 6A:
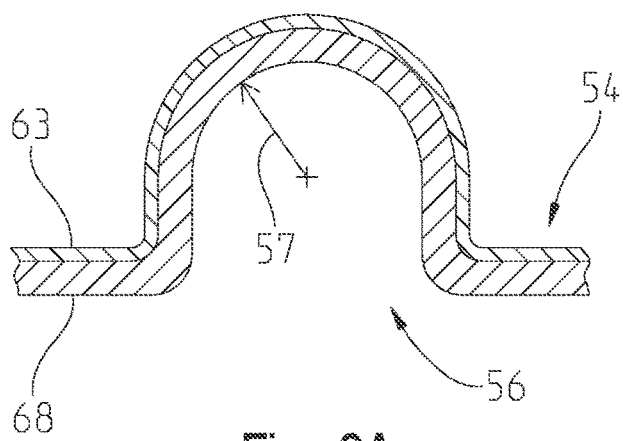
FIG. 6A is a cross-sectional view of a second support portion of the support assembly having a first profile.

FIGS. 6A-6D illustrate various illustrative embodiments of cross-sectional profiles of groove 56 of door 54. In each of the embodiments, groove 56 and mounting plate 54 are comprised of two distinct layers comprised of retention element 68 and a layer 61 comprised of a structural material defining the outer surface of door 54. This can include, but is not limited to, a metal or a plastic material. In the embodiment of FIG. 6A, the cross sectional profile of groove 56 is defined by at least one rounded surface and, illustratively, generally defines a semicircular profile. The semicircular shape of groove 56 may have a radius 57 that is generally constant. In other embodiments, radius 57 of the semicircular groove 56 may be variable.

Figure 6B:
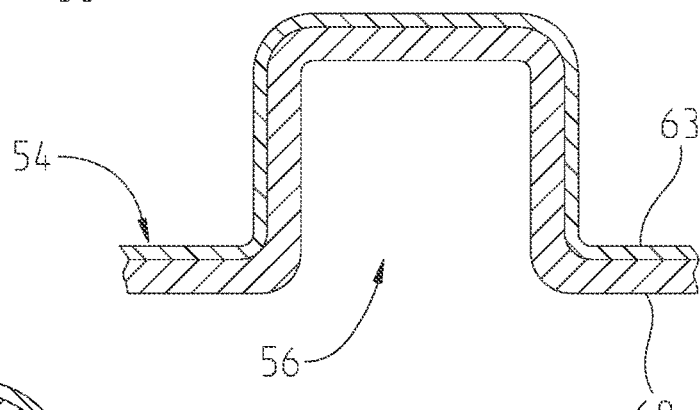
FIG. 6B is a cross-sectional view of the second support portion having a second profile.
Figure 6C:
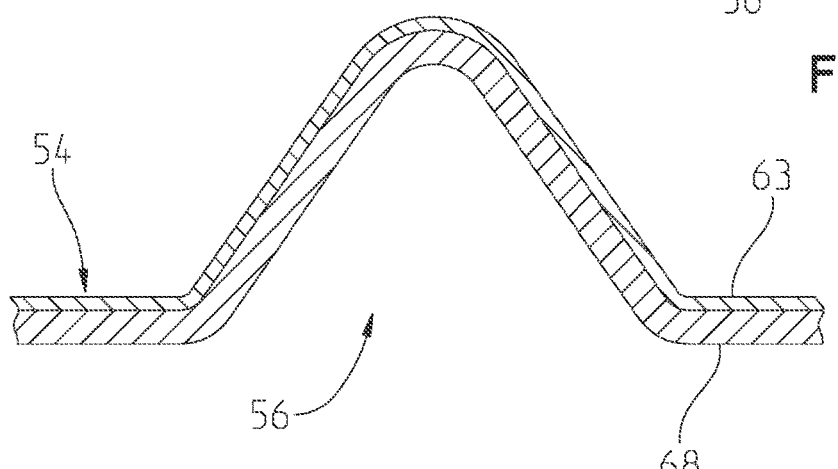
FIG. 6C is a cross-sectional view of the second support portion having a third profile.
Figure 6D:
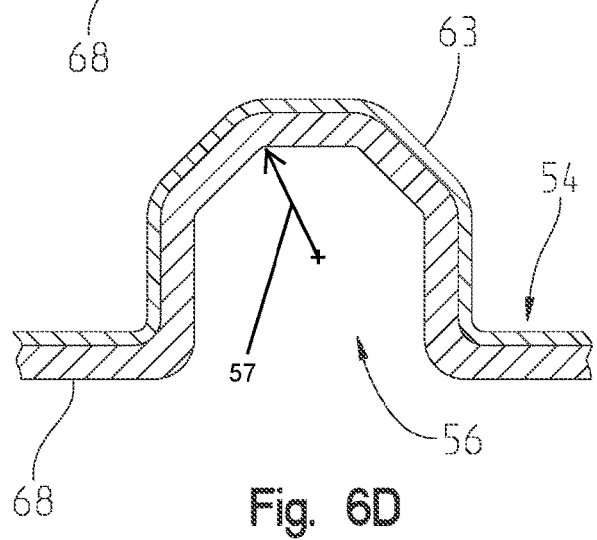
FIG. 6D is a cross-sectional view of the second support portion having a fourth profile.

With respect to FIGS. 6B-6D, groove 56 may include at least one linear surface. For example, FIG. 6B illustrates an additional embodiment of the cross-sectional profile of groove 56 such that the cross-section is generally square. In similar embodiments, the cross-sectional profile of groove 56 may be generally rectangular. FIG. 6C illustrates an additional embodiment of the cross-sectional profile of groove 56 such that the cross-section is generally triangular.

Additionally, FIG. 6D illustrates another embodiment of groove 56 such that the cross-sectional profile is semi-hexagonal. The cross-sectional profile of groove 56 is not limited to these illustrative embodiments and may comprised of varying shapes, including but not limited to, a semi-ellipse or pentagonal shape. The ability to vary the shape of the groove 56 is advantageous such that different tools can be fit securely within the groove 56 of the support assembly 40 because various surfaces of the tools/accessories may be frictionally retained against the linear surfaces defining groove 56.

Figure 7:
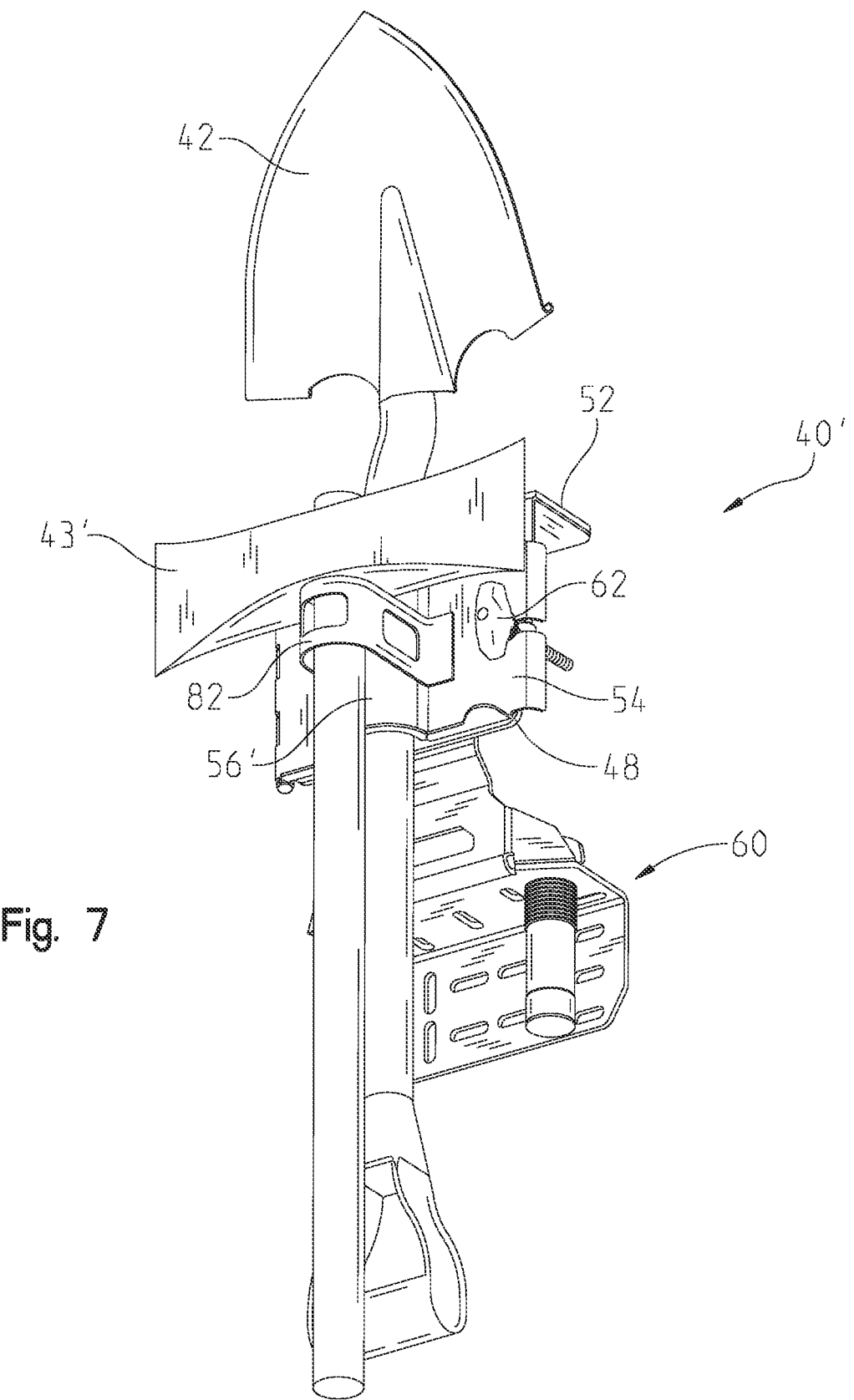
FIG. 7 is a perspective view of a second embodiment support assembly of the present disclosure.

FIGS. 7-10 illustrate additional embodiments of support assembly 40 configured such that multiple tools 42, 43 may be held by support assembly 40 simultaneously. Referring now to FIG. 7, an alternative embodiment support assembly 40' comprises mounting plate 48 and door 54. Door 54 comprises a retention feature, illustratively a groove 56', that is configured for holding a tool 42, 43. A second retention feature, illustratively a second groove 82, is attached door 54. In one embodiment, second groove 82 may be a Rhino Grip available from Kolpin Outdoors, Inc., located at 9955 59$^{th}$ Ave N in Plymouth, MN 55442 such as that shown in U.S. Patent Application Publication No. 2019/0344727, filed May 8, 2018, and entitled "FIN GRIP WITH INDEPENDENTLY ADJUSTABLE ARMS", the complete disclosure of which is expressly incorporated herein by reference.

Second groove 82 may be adjusted for size and shape and is removable from door 54. In this embodiment, support assembly 40' is configured such that groove 56' holds first tool 42 and second groove 82 holds a second tool 43'. Door 54 is maintained in the closed configuration due to clamping assembly 62. When door 54 is rotated to the open configuration, tool 42 may be exposed and removed from support assembly 40'. Further, regardless of the position of door 54, second groove 82 may be moved or adjusted relative to door 54 to allow for removal of second tool 43'. Alternatively, second tool 43' may be configured to slide within the opening defined by second groove 82' such that movement or adjustment of second groove 82' is not needed to remove second tool 43'.

Figure 8:
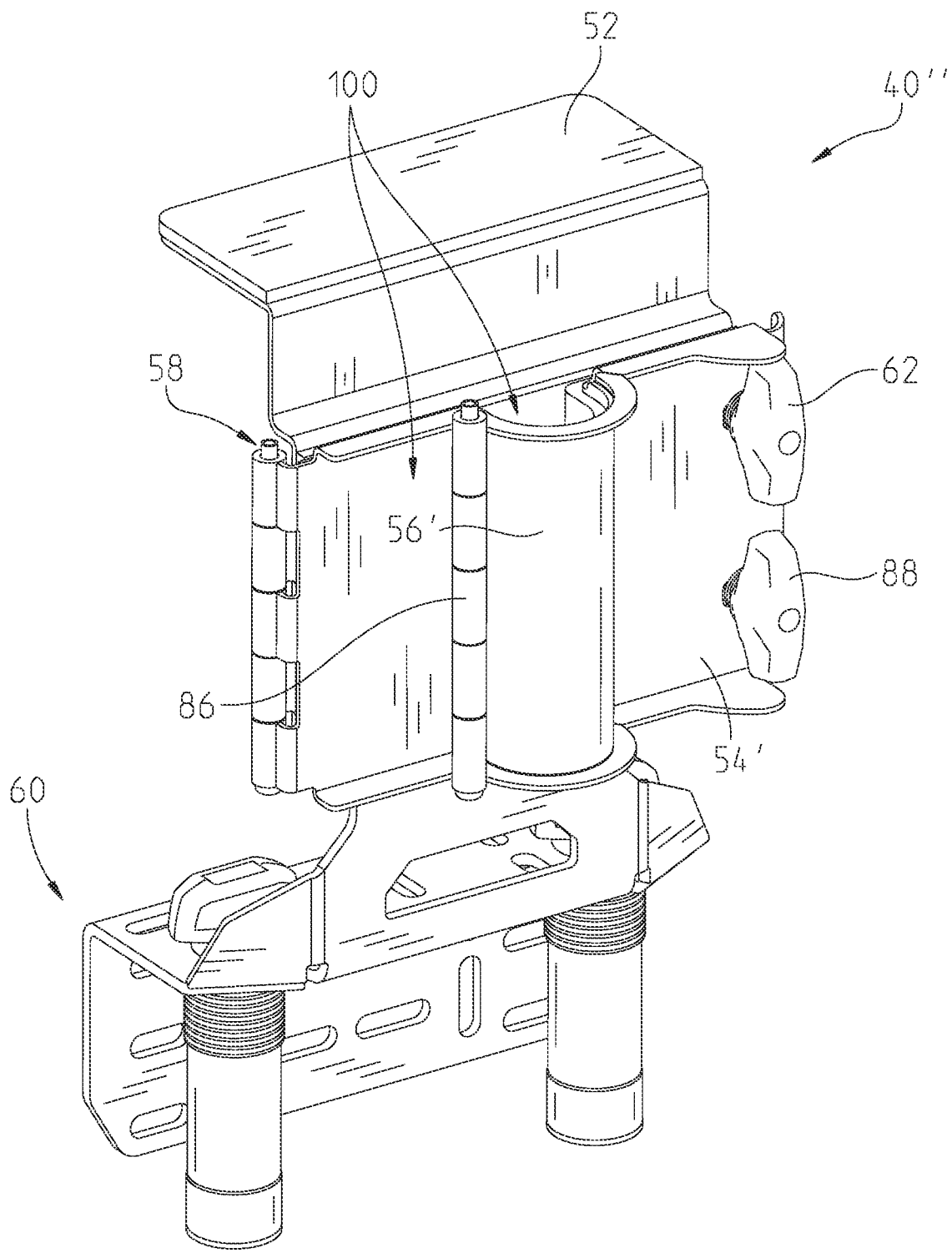
FIG. 8 is a perspective view of a third embodiment support assembly of the present disclosure.

Referring now to FIG. 8, an alternative embodiment support assembly 40" is illustrated. In this embodiment, support assembly 40" comprises first mounting plate 48 and a door 54'. Door 54' is attached to mounting plate 48 with hinge assembly 58 such that it can rotate relative to mounting plate 48. Support assembly 40" further comprises clamping assembly 62 to be secured onto mounting plate 48 when desirable to have door 54' in a closed configuration. Door 54' comprises a groove 56' attached to door 54' through a second hinge assembly 86 such that groove 56" can rotate relative to door 54'. Support assembly 40" further comprises a second clamping assembly 88 configured for securing the groove 56" to door 54' and/or mounting plate 48 when groove 56' is in the closed configuration shown in FIG. 8.

In embodiments, hinge assembly 58 may be configured to attach groove 56" and door 54' to mounting plate 48, such that both groove 56" and door 54' independently rotate with respect to mounting plate 48. In this way, second hinge assembly 86 is omitted. Clamping assembly 62 and second clamping assembly 88 maintain the ability to independently secure door 54' to mounting plate 48 and groove 56" to door 54' and/or mounting plate 48, respectively. In this embodiment, first and second clamping assemblies 62, 88 are displayed as vertically aligned with one another on door 54', but the positioning is variable. For example, clamping assembly 88 can be positioned closer to groove 56" than first clamping assembly 62. Further, in this embodiment, groove 56" is illustrated to be positioned generally in the center of door 54', but the position is variable. For example, groove 56" may be positioned closer to hinge assembly 58.

In this way, support assembly 40" can hold at least two tools simultaneously. Groove 56" has the capability of holding a tool that can be placed into and removed from groove 56" while door 54' is retained in the closed or open configuration. In this way, door 54' and mounting plate 48 retain a tool independently of groove 56". It may be appreciated that an outer surface 100 of door 54' extends linearly and continuously between hinge assembly 58 and clamping assembly 62 and, therefore, at the location of groove 56", outer surface 100 of door 54' is positioned intermediate groove 56" and mounting plate 48. Additionally, clamping assembly 62 may be used to move door 54' into the open configuration in order to access a tool while groove 56" stays in the closed configuration.

Figure 9:
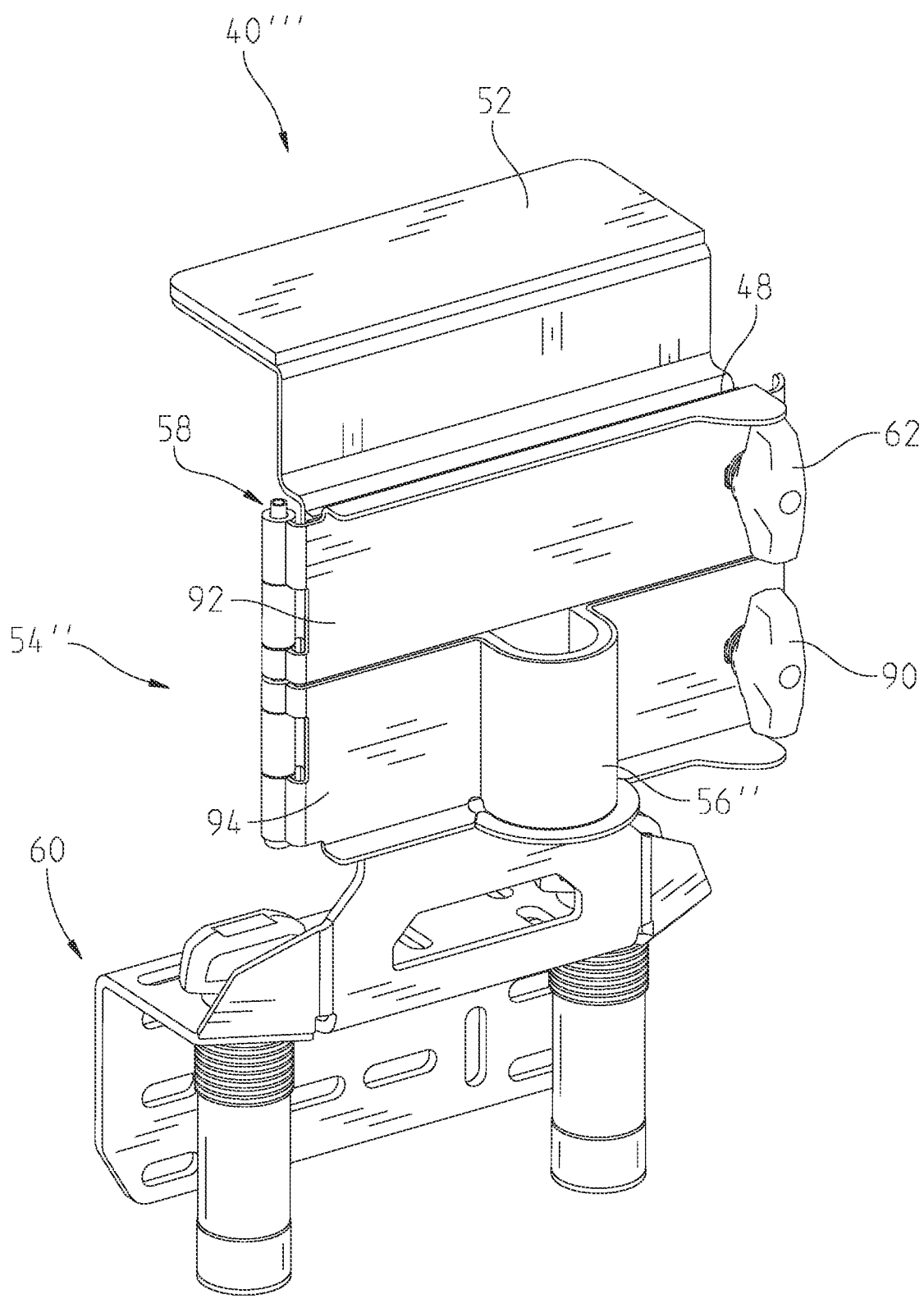
FIG. 9 is a perspective view of a fourth embodiment support assembly of the present disclosure.

Referring now to FIG. 9, an alternative embodiment support assembly 40''' is shown. In this embodiment, support assembly 40''' comprises first mounting plate 48, attachment assembly 60, and support plate 52. Support assembly 40''' further comprises a door 54" that is connected to mounting plate 48 through hinge assembly 58 and first clamping mechanism 62. Additionally, support assembly 40''' includes a second clamping mechanism 90. Door 54" is comprised of an upper portion 92 and a lower portion 94. Lower portion 94 comprises a groove 56''' that is configured to hold at least one tool (e.g., tools 42, 43). In certain instances, groove 56''' holds exactly one tool. First clamping mechanism 62 is configured for retaining upper portion 92 of door 54" to mounting plate 48. Lower portion 94 of door 54" comprises second clamping mechanism 90 which is configured for retaining lower portion 94 to mounting plate 48. First and second clamping mechanisms 62, 90 are configured such that they may be independently released to open the upper portion 92 or lower portion 94, respectively. In this way, a tool can be held and retained between upper portion 92 and mounting plate 48 while a second tool is held in groove 56''' of lower portion 94 of door 54".

Figure 10:
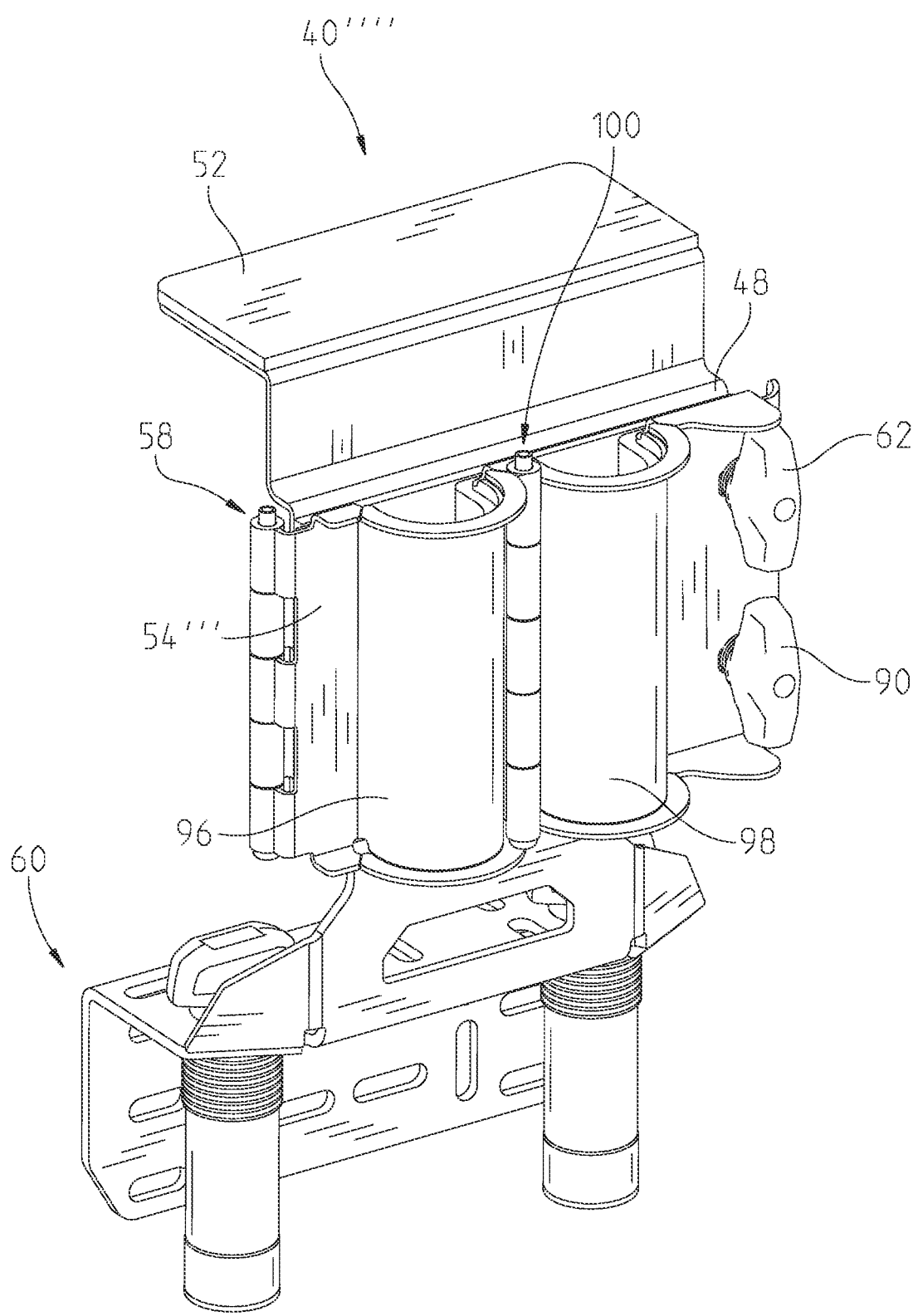
FIG. 10 is a perspective view of a fifth embodiment support assembly of the present disclosure.

Referring now to FIG. 10, an alternative embodiment support assembly 40"" is illustrated. In this embodiment, support assembly 40"" is comprised of attachment assembly 60, mounting plate 48, and support plate 52. Support assembly 40"" further comprises a door 54''' having a first groove 96 and a second groove 98. Door 54''' is attached to mounting plate 48 through hinge assembly 58 such that door 54''' rotates relative to mounting plate 48. Support assembly 40''' further comprises first clamping mechanism 62 in order to retain door 54''' to mounting plate 48. A second hinge assembly 100 is positioned between first groove 96 and second groove 98 to allow second groove 98 to rotate between a closed configuration (FIG. 10) and an open configuration relative to first groove 96. Second clamping mechanism 90 is configured to secure at least one of first groove 96 and second groove 98 to the door 56''' and/or mounting plate 48. In embodiments, second clamping mechanism 90 is configured to retain both first groove 96 and second groove 98 to door 56''' and/or mounting plate 48. In this way, support assembly 40"" can be configured to hold at least three tools simultaneously. For example, first groove 96 is configured to hold a tool, second groove 98 is configured to hold a tool, and a tool may be held between mounting plate 48 and door 56'''. It may be appreciated that because support assembly 40"" includes separate hinge assemblies and clamping assemblies associated with grooves 96, 98, various tools/accessories may be accessed from any of grooves 96, 98 and/or at door 56''' independently of each other while other tools remain secured within support assembly 40'''. Further, with respect to the illustrative term "groove" used herein, it is to be appreciated that "groove" defines any retention feature configured to support a tool or accessory on support assembly 40"" and is not limited to any structural definition of "groove."

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A support assembly configured for holding at least one tool and comprising:
   a mounting plate;
   a door attached to the mounting plate and pivotable relative to the mounting plate, the door comprising a retention feature projecting from the door to define a groove configured for receiving the at least one tool and a retention element positioned along at least a portion of an inner surface of the door and an inner surface of the groove; and a clamping assembly adapted to apply pressure to hold the at least one tool between the door and the mounting plate.

2. The support assembly of claim 1, wherein the support assembly is configured for mounting onto a utility vehicle.

3. The support assembly of claim 1, wherein the retention element is a layer of material adhered to an inner surface of the door and configured to retain the tool in position.

4. The support assembly of claim 3, wherein the retention element is a layer of foam or rubber.

5. The support assembly of claim 1, wherein the retention feature is defined by at least one rounded surface.

6. The support assembly of claim 5, wherein the retention feature is generally semicircular.

7. The support assembly of claim 1, wherein the retention feature is defined by at least one linear surface.

8. The support assembly of claim 7, wherein the retention feature is generally triangular.

9. The support assembly of claim 1, wherein the retention feature is continuous with the door.

10. A support assembly configured for placement onto a utility vehicle and comprising:
    a mounting plate;
    a door attached to the mounting plate and pivotable relative to the mounting plate, the door comprising a retention feature defined by a groove configured for receiving at least one tool and pivotable relative to an outer surface of the door;
    a first clamping assembly configured for clamping the door to the mounting plate; and
    a second clamping assembly configured for clamping the groove to the outer surface of the mounting plate.

11. The support assembly of claim 10, wherein the retention feature is generally triangular.

12. The support assembly of claim 10, wherein the retention feature is generally semicircular.

13. The support assembly of claim 10, wherein the retention feature extends a length generally equal to a length of the door.

14. The support assembly of claim 10, wherein the door comprises a plurality of retention feature.

15. The support assembly of claim 14, wherein each of the plurality of retention feature is pivotable relative to each other and each of the plurality of retention feature comprises a clamping assembly for clamping with the mounting plate.

16. A support assembly configured for placement onto a vehicle and comprising:
    a mounting plate;
    a door attached to, and pivotable relative to, the mounting plate;
    a first clamping assembly adapted to apply pressure to hold the at least one tool between the mounting plate and the door;
    a retention feature attached to the door configured for receiving the at least one tool; and
    a second clamping assembly adapted to apply pressure for attaching the retention feature to the mounting plate.

17. The support assembly of claim 16, wherein the retention feature comprises a shape that is at least one of a generally triangular, semicircular, rectangular, and square-like shape.

18. The support assembly of claim 16, wherein the support assembly further comprises a second retention feature.

19. The support assembly of claim 16, wherein the retention feature comprises a radius that is variable.

20. The support assembly of claim 1, wherein the retention element is configured to secure the at least one tool and the at least one tool is in contact with at least one of the retention element or the mounting plate.

* * * * *